Patented Feb. 4, 1947

2,415,193

UNITED STATES PATENT OFFICE 2,415,193

POLYAMIDE SOLUTIONS

Arthur O. Rogers, Lewiston, N. Y., assignor to E. I. du Pont de Nemours & Company, Wilmington, Del., a corporation of Delaware No Drawing. Application September 30, 1943, Serial No. 504,439

14 Claims. (Cl. 260—29)

This invention relates to compositions of matter, and more particularly to new and useful compositions of matter comprising solutions of synthetic linear polyamides.

The synthetic linear polyamides with which this invention is concerned are the type described in United States Patents Nos. 2,071,250, 2,071,253 and 2,130,948. It is, therefore, to be understood that the expression "synthetic linear polyamide" as used herein designates a polyamide such as is disclosed in the above-identified patents. The polyamide are of two types, those derived from polymerizable monoaminomonocarboxylic acids or their amide-forming derivatives, and those derived from the reaction of suitable diamines with suitable dicarboxylic acids or amide-forming derivatives of dibasic carboxylic acids. A characteristic property of these polyamides is that they can be formed into filaments which can be cold-drawn into fibers showing molecular orientation along the fiber axis. These polyamides are most useful for the preparation of fibers, bristles, ribbons, sheets, foils, and coatings on wood, metal, paper, fabric, regenerated cellulose and the like.

Articles prepared from the polyamides are resistant to moisture, resistant to most solvents, and possess an unusually high degree of toughness and strength. However, the commercial production of articles formed of or containing polyamides has been limited mostly to the extrusion of the polymer from the molten state. There are obvious advantages in the use of solutions over molten compositions to achieve the fluid state necessary in lacquers, coating compositions and dopes suitable for use in forming various articles, such as films, sheets, ribbons, bristles and films. For example, in coating fabrics, paper or other materials which are charred or tendered by high temperatures, the use of a solution which can be applied and subsequently evaporated to dryness at a relatively low temperature does not cause deterioration of the material being coated. It is often desirable to prepare a fluid composition for use over a period of time and, in that event, it is convenient if the composition can be kept in the liquid state for storage at ordinary temperatures. The application of such solutions as lacquers or adhesives is much more easily carried out by methods well known in the art than is the application by a molten composition. Further, the incorporation of a plasticizer or other modifying agent into polyamides is frequently more advantageously done by addition of the plasticizer or other modifying agent to a solution of the polyamide rather than to a molten polyamide. Further, there is a tendency with certain types of plasticizers and modifying agents to be less compatible at high temperatures required for blending in a melt whereas they can be readily incorporated in a polyamide solution at low temperatures. A still further advantage in the use of solutions lies in the ease with which they can be cast into films or coatings of uniform thickness, which is mechanically more difficult to accomplish with a molten composition due to its relatively high viscosity.

Although there is in the prior art certain solvents for the polyamides (see U. S. Patents Nos. 2,130,948, 2,293,760 and 2,293,761), such solvents are not practical with the more insoluble simple polyamides, such as highly polymerized hexamethylene adipamide.

An object of this invention is new and useful compositions of matter comprising organic solvent solutions of the synthetic linear polyamides which are stable and useful for the production of shaped articles. Another object of the invention is to provide a solution of a synthetic linear polyamide in a hydroxy organic cyanide. A specific object of the invention is to provide a solution of a synthetic linear polyamide in a cyanhydrin.

These and other objects of the invention are accomplished, in general, by dissolving the polyamides in mono-hydroxy organic cyanides which are liquids at ordinary temperatures (70° C. to 80° C.).

The invention will be described more specifically in the following examples which are typical embodiments and in no way limitative of the invention, and wherein the parts are by weight and the expression "intrinsic viscosity" is to be understood in accordance with the definition thereof contained in United States Patent No. 2,130,948.

Example 1

To 5 parts of polyhexamethylene adipamide having an intrinsic viscosity of 1.2 are added 20 parts of isobutyraldehyde cyanhydrin. The mixture is heated with stirring on a bath to a temperature of 150° C. when the polymer dissolves easily.

From the solution prepared above, filaments are prepared by the dry-spinning process by extrusion of the solution through a spinneret, allowing the solvent to evaporate and collecting the freshly formed filaments on a bobbin. Thereafter, the filaments are cold-drawn, twisted, and wound in the conventional fashion. The yarn so prepared is strong, resilient, glossy and non-sensitive to moisture.

Example II

To 15 parts of polyhexamethylene adipamide having an intrinsic viscosity of 0.60 are added 85 parts of acetaldehyde cyanhydrin and the mixture heated with stirring on a bath. The solution of the polymer is completed at 125° C.

This solution is applied to copper wire by dipping the wire in the solution and thereafter baking. The coating is smooth and glossy and does not peel or crack when the wire is bent.

Example III

To 18 parts of polyhexamethylene sebacamide having an intrinsic viscosity of 0.55 are added 82 parts of formaldehyde cyanhydrin and the mixture heated on a bath to a temperature of 100° C. Solution of the polymer is complete at this temperature.

The solution is applied as a thin coating to a wood surface. The coating is smooth, hard and highly resistant to moisture.

Example IV

To 15 parts of hexamethylene adipamide having an intrinsic viscosity of 1.0 are added 85 parts of ethylene cyanhydrin (beta-hydroxy propionitrile) and the mixture heated on a bath to a temperature of 150° C. when the polymer dissolves.

The solution is used to form a coating on wire screen by dipping the screen in the solution and drying. During or subsequent to the dipping operation, the excess solution is removed from the interstices. The coating shows good adherence to the metal and good resistance to abrasion.

Example V 5 parts of an interpolymer prepared from hexamethylene adipamide and hexamethylene sebacamide in the weight ratio of 30:70 and having an intrinsic viscosity of 1.0 are mixed with 20 parts of isobutyraldehyde cyanhydrin, and the mixture heated with stirring to a temperature of 60° C. Solution of the polymer is quite rapid at this temperature and it remains clear on standing.

This solution is cast on a glass plate at 167° C. After cooling, the film is easily stripped from the casting surface. It is perfectly clear, shows no brittleness, has excellent strength, and can be stretched appreciably.

Example VI

To 1 part of an interpolymer prepared from hexamethylene adipamide and hexamethylene sebacamide in the weight ratio of 60:40 and having an intrinsic viscosity of 0.8 are added 9 parts of acetone cyanhydrin, and the mixture heated on a bath to 56° C. Solution of the polymer is complete at this temperature and the solution remains clear on standing.

This solution is used to coat cotton fabric. The coated fabric remains flexible, has good resistance to wear, and is highly impervious to moisture.

In the foregoing examples, the cyanhydrins, or alpha-hydroxy organic cyanides, are the preferred choice of solvents for the polyamides but it will be understood that other mono-hydroxy organic cyanides, preferably those which are liquids at ordinary temperatures (70° C. to 80° C.), can be used as solvents. The carbon content of the hydrocarbon residue of the hydroxy organic cyanides will preferably not exceed four, and generally a branched hydrocarbon chain is preferable. Better solvent action, particularly at ordinary temperatures, is observed when the hydroxyl and cyanide groups are separated by not more than two carbon atoms. If the hydrocarbon residue is cyclic, particularly aromatic, a higher number of carbon atoms may be tolerated without departing from the preference for solvents which are liquid at ordinary temperatures (70° C. to 80° C.). Since the cyanhydrins are derivable from aldehydes and ketones by known methods, it will be understood that aldehydes and ketones which comply with the above carbon contents will be particularly useful as raw materials for the preparation of preferred solvents. In addition to the solvents disclosed above, there may be included alpha-hydroxy butyro cyanide, beta-hydroxy butyro cyanide, and gamma-hydroxy butyro cyanide; alpha-hydroxy valero cyanide, beta-hydroxy valero cyanide, and gamma-hydroxy valero cyanide; beta-hydroxy isovalero cyanide; epsilon-hydroxy capro cyanide; and benzaldehyde cyanhydrin.

The solvents herein referred to may be used singly or conjointly with each other or conjointly with other solvents or diluents, as desired.

The proportions of the polymer and the solvent are not restricted to the specific proportions set forth in the examples, since solutions having a concentration of polymer up to 50%, or indeed more, can be obtained.

While the solvent action of the hydroxy organic cyanides is especially suitable for the highly polymerized polyamides, it is not specifically limited thereto, since the invention is applicable also to polyamides of both high and low degrees of polymerization.

Similarly, while the invention is most important with respect to the simple polyamides, it is equally useful for the interpolyamides. Examples of such interpolyamides would include those derived from the combination of the following diamines with the following dibasic acids:

Diamines:
    Tetramethylenediamine
    Pentamethylenediamine
    Hexamethylenediamine
    Octamethylenediamine
    Decamethylenediamine Dibasic acids:
    Adipic acid
    Sebacic acid
    Suberic acid
    Azelaic acid In general, the polyamide should have an intrinsic viscosity above 0.4, and preferably above 0.6. As previously mentioned in connection with the examples, the expression "intrinsic viscosity" is to be understood in accordance with the definition thereof contained in United States Patent No. 2,130,948.

While these solutions are generally prepared by heating on a bath, other suitable means may be used. Stirring of the mixture during the heating process is advantageous but is not always necessary. Refluxing during solution is preferable but is not a necessary embodiment of the invention. Likewise, the use of heat to accomplish solution of the materials is advantageous, although the same results may be achieved in many instances in longer periods of time by allowing the mixture to stand without heating or stirring.

The properties of objects formed from the compositions herein described may be modified by appropriate modification of the compositions. Thus, the compositions of this invention may have incorporated therein various modifying agents, such as plasticizers, dyes, pigments, diluents, resins, cellulose derivatives, waxes, water repellents, luster modifying agents, anti-oxidants, oils, antiseptics, flame repellents, and the like.

While specific reference has been made to the use of the solution for the formation of a film or filament, the invention is not restricted thereto, since the solution is useful for forming a variety of objects irrespective of the shape of the object. Typical objects which can be formed from the solutions are fibers, filaments, monofils, tubular structures, bristles, surgical sutures, fishing leaders, fishline, dental floss, films, ribbons, sheets, foils, safety glass interlayers, golf ball covers, and plasticized or otherwise modified solid compositions useful for making molded articles. The solutions are also useful for application as lacquers on wood, metal, glass and other surfaces, for coating wire, fabrics, paper, regenerated cellulose and the like, and for impregnating fabric, paper and other porous materials.

Particular advantages of the use of cyanhydrin solutions of the polyamides reside chiefly in the fact that they may be used at much lower temperatures than have been possible in the prior art method of melt-extrusion. For instance, many of these solutions may be used at room temperatures. Again, the formation of shaped objects is much more easily accomplished from solutions than is possible from the molten polymer, and the degrading action of high temperatures on the polymer is avoided. Shaped articles prepared from the herein described solutions of the polyamides are resistant to moisture, resistant to most solvents, and possess an unusually high degree of toughness and strength.

Since it is obvious that many changes and modifications can be made in the above-described details without departing from the nature and spirit of the invention, it is to be understood that the invention is not to be limited thereto except as set forth in the appended claims.

I claim:

1. A composition of matter comprising a solution of a synthetic linear polyamide in a normally liquid mono-hydroxy organic cyanide, said linear polyamide comprising the reaction product of a linear polymer-forming composition which comprises in substantial amount reacting material selected from one of the groups consisting of (a) monoaminomonocarboxylic acids and (b) mixtures of diamine with dibasic carboxylic acid.

2. A composition of matter comprising a solution of a synthetic linear polyamide in a normally liquid monohydroxy organic cyanide containing not more than 4 carbon atoms in the hydrocarbon residue thereof attached to the hydroxyl and cyanide groups, said linear polyamide comprising the reaction product of a linear polymer-forming composition which comprises in substantial amount reacting material selected from one of the groups consisting of (a) monoaminomonocarboxylic acids and (b) mixtures of diamine with dibasic carboxylic acid.

3. A composition of matter comprising a solution of a synthetic linear polyamide in a normally liquid monohydroxy organic cyanide containing not more than 4 carbon atoms in the hydrocarbon residue thereof attached to the hydroxyl and cyanide groups and not more than 2 carbon atoms separating the hydroxyl and cyanide groups, said linear polyamide comprising the reaction product of a linear polymer-forming composition which comprises in substantial amount reacting material selected from one of the groups consisting of (a) monoaminomonocarboxylic acids and (b) mixtures of diamine with dibasic carboxylic acid.

4. A composition of matter comprising a solution of a synthetic linear polyamide in a normally liquid cyanhydrin, said linear polyamide comprising the reaction product of a linear polymer-forming composition which comprises in substantial amount reacting material selected from one of the groups consisting of (a) monoaminomonocarboxylic acids and (b) mixtures of diamine with dibasic carboxylic acid.

5. A composition of matter comprising a solution of a synthetic linear polyamide in a normally liquid cyanhydrin containing not more than 4 carbon atoms in the hydrocarbon residue thereof attached to the hydroxyl and cyanide groups, said linear polyamide comprising the reaction product of a linear polymer-forming composition which comprises in substantial amount reacting material selected from one of the groups consisting of (a) monoaminomonocarboxylic acids and (b) mixtures of diamine with dibasic carboxylic acid.

6. A composition of matter comprising a solution of a synthetic linear polyamide in a normally liquid cyanhydrin containing not more than 4 carbon atoms in the hydrocarbon residue thereof attached to the hydroxyl and cyanide groups and not more than 2 carbon atoms separating the hydroxyl and cyanide groups, said linear polyamide comprising the reaction product of a linear polymer-forming composition which comprises in substantial amount reacting material selected from one of the groups consisting of (a) monoaminomonocarboxylic acids and (b) mixtures of diamine with dibasic carboxylic acid.

7. A composition of matter comprising a solution of a synthetic linear polyamide in isobutyraldehyde cyanhydrin, said linear polyamide comprising the reaction product of a linear polymer-forming composition which comprises in substantial amount reacting material selected from one of the groups consisting of (a) monoaminomonocarboxylic acids and (b) mixtures of diamine with dibasic carboxylic acid.

8. A composition of matter comprising a solution of a synthetic linear polyamide in acetaldehyde cyanhydrin, said linear polyamide comprising the reaction product of a linear polymer-forming composition which comprises in substantial amount reacting material selected from one of the groups consisting of (a) monoaminomonocarboxylic acids and (b) mixtures of diamine with dibasic carboxylic acid.

9. A composition of matter comprising a solution of a synthetic linear polyamide in formaldehyde cyanhydrin, said linear polyamide comprising the reaction product of a linear polymer-forming composition which comprises in substantial amount reacting material selected from one of the groups consisting of (a) monoaminomonocarboxylic acids and (b) mixtures of diamine with dibasic carboxylic acid.

10. A composition of matter comprising a solution of 5 parts of polyhexamethylene adipamide having an intrinsic viscosity of 1.2 in 20 parts of isobutyraldehyde cyanhydrin, the parts being by weight.

11. A composition of matter comprising a solution of 15 parts of polyhexamethylene adipamide having an intrinsic viscosity of 0.65 in 85 parts of acetaldehyde cyanhydrin, the parts being by weight.

12. A composition of matter comprising a solution of 18 parts of polyhexamethylene sebacamide having an intrinsic viscosity of 0.55 in 82 parts of formaldehyde cyanhydrin, the parts being by weight.

13. A composition of matter comprising a solution of a synthetic linear polyamide in a normally liquid monohydroxy organic cyanide containing not more than 4 carbon atoms in the chain of the hydrocarbon residue thereof attached to the hydroxyl and cyanide groups, said linear polyamide comprising the reaction product of a linear polymer-forming composition which comprises in substantial amount reacting material selected from one of the groups consisting of (a) monoaminomonocarboxylic acids, and (b) mixtures of diamine with dibasic carboxylic acid.

14. A composition of matter comprising a solution of a synthetic linear polyamide in a normally liquid monohydroxy organic cyanide containing not more than 4 carbon atoms in the chain of the hydrocarbon residue thereof attached to the hydroxyl and cyanide groups and not more than 2 carbon atoms separating the hydroxyl and cyanide groups, said linear polyamide comprising the reaction product of a linear polymer-forming composition which comprises in substantial amount reacting material selected from one of the groups consisting of (a) monoaminomonocarboxylic acids, and (b) mixtures of diamine with dibasic carboxylic acid.

ARTHUR O. ROGERS.

REFERENCES CITED

The following references are of record in the file of this patent:

UNITED STATES PATENTS

| Number | Name | Date |
| --- | --- | --- |
| 2,285,178 | Thinius | June 2, 1942 |